United States Patent [19]

Darrin

[11] Patent Number: 5,018,900

[45] Date of Patent: May 28, 1991

[54] PROCESS FOR CONNECTING AND ASSEMBLING TUBULAR ELEMENTS, IN PARTICULAR FOR CONSTRUCTING A BICYCLE FRAME

[75] Inventor: Alain Darrin, Saint Germain au Mont d'Or, France

[73] Assignee: Technique du Verre Tisse S.a., France

[21] Appl. No.: 436,445

[22] Filed: Nov. 14, 1989

[30] Foreign Application Priority Data

Nov. 17, 1988 [FR] France ................. 88 15200

[51] Int. Cl.⁵ ............................................. F16B 11/00
[52] U.S. Cl. ..................... 403/267; 403/266; 403/296; 280/281.1; 29/456
[58] Field of Search ............... 403/266–268, 403/265, 292, 296, 308, 264, 279, 297, 370, 368; 29/456, 458, 469.5, 525; 280/281.1; 285/915, 370

[56] References Cited

U.S. PATENT DOCUMENTS

| | | | |
|---|---|---|---|
| 589,950 | 9/1897 | Temple | 403/264 X |
| 2,308,542 | 1/1943 | Raybould | 403/297 |
| 3,434,900 | 3/1969 | Bender | 29/456 X |
| 4,120,512 | 10/1978 | Newlands | 280/281.1 |
| 4,411,114 | 10/1983 | Wurtinger et al. | 403/267 X |
| 4,484,831 | 11/1984 | Hanson, Jr. et al. | 403/296 X |
| 4,583,755 | 4/1986 | Diekman et al. | 403/292 X |
| 4,598,922 | 7/1986 | Kleinebenne et al. | 403/298 X |
| 4,648,616 | 3/1987 | Diekman et al. | 403/265 X |
| 4,896,991 | 1/1990 | Yashuhara | 285/915 X |
| 4,940,356 | 7/1990 | Hashimoto et al. | 280/281.1 X |

FOREIGN PATENT DOCUMENTS

| | | | |
|---|---|---|---|
| 1114386 | 12/1955 | France | 403/268 |
| 2142171 | 1/1973 | France . | |
| 2331475 | 6/1977 | France . | |
| 2373436 | 8/1980 | France . | |
| 2523541 | 9/1983 | France . | |
| 2546473 | 11/1987 | France . | |
| 2600031 | 12/1987 | France . | |
| 575144 | 2/1946 | United Kingdom . | |

*Primary Examiner*—Peter M. Cuomo
*Attorney, Agent, or Firm*—Wall and Roehrig

[57] ABSTRACT

Process for connecting and assembling tubular elements, according to which the various tubes (1) are joined to one another by connectors or sleeves (2), the ends (10-3) of these two elements being fitted one inside the other and the bond being obtained by adhesive bonding.

The process is distinguished by the fact that, after fitting the two members one inside the other and before the adhesive has set, an additional connector (4) is introduced inside one of the elements, one part (5) of the additional connector being pressed against the inside of the surface (8) of the element inside which it has been introduced, and the other part (6) of the additional connector being screwed inside the second element, the final setting of the adhesive taking place after installation of this additional joining element.

11 Claims, 2 Drawing Sheets

PROCESS FOR CONNECTING AND ASSEMBLING TUBULAR ELEMENTS, IN PARTICULAR FOR CONSTRUCTING A BICYCLE FRAME

In the technical field of assembling or connecting tubular elements, it has been proposed for some considerable time to replace the conventional assembling techniques, requiring welding, force fitting, screwing . . . , with adhesive bonding techniques, as disclosed in particular in French Patent 2,142,171, British Patent 575,144 and French Patents 2,331,475 and 2,373,436.

These adhesive bonding techniques are particularly valuable wherever it is desired to make things lighter and are used in particular when it is desired to connect a plurality of tubes to one another by means of additional connectors allowing a structure in which the tubes are oriented differently to one another, such as in particular in order to form a bicycle frame, to be obtained.

In the rest of the description, the invention will be described more particularly in respect of this application, although it could, if necessary, be implemented in other fields where similar problems are encountered.

As disclosed in the abovementioned documents, the construction of bicycle frames by assembling and adhesively bonding tubular elements by means of connecting sleeves has been known for some considerable time.

In view of the development of adhesives, the bond between the tubular elements and the sleeves is in general of sufficient strength. However, as far as the frame of a bicycle is concerned, certain areas are subjected to very violent, repetitive forces and more particularly in the region of the connector supporting the bottom bracket. Indeed, the tractive forces which are exerted in this area may eventually give rise to play, or even cause the tube to be torn away from the joining connector.

Now it has been found, and this forms the object of the present invention, that it is possible, in a simple and efficient manner, to solve this problem and to practically eliminate any risk of tearing away in the region where the tube and the connecting element are joined.

In general terms, the invention relates to an improvement to the process for connecting and assembling tubular elements, in which process the various tubes are joined to one another by means of connectors or sleeves, the ends of these two elements being fitted together one inside the other and the bond being obtained by an adhesive, the process according to the invention being distinguished by the fact that, after fitting the two members one inside the other and before the adhesive has set, an additional connector is introduced inside one of the elements, one part of said additional connector being "pressed" against the inside of the surface of the element inside which it is introduced, and the other part of said additional connector being screwed inside the second element, the final setting of the adhesive taking place after installation of this additional joining element.

"Pressing", in the context of the present invention, is understood to mean not only the case where the surfaces are actually in mutual contact, but also that where a slight clearance exists between said surfaces, as a result of the manufacturing tolerances for example, this clearance being filled by the adhesive which flows during the installation of the additional connector.

Preferably, in particular when the tubes are constructed from "composite materials", such of those forming the subject of French Patent 2,546,473, the additional connector is introduced inside the tubular element and is screwed inside the actual connector. In this embodiment, in particular when the tube is fitted outside the connector, it being possible for this jointing to be either cylindrical or slightly conical, the head of the additional connector element is pressed against a surface forming a stop in the form of an inclined plane (and at most orthogonal to the axis of assembly), which further reinforces the bond between the two elements.

Furthermore, although the threaded parts of the additional connector and of the corresponding area in which the screwing takes place are preferably cylindrical, they could, if necessary, be slightly conical. Moreover, the surface of the head of the additional connector element is preferably smooth, but could, if necessary, have a different surface condition, for example one with ribbing, raised and recessed parts, so as to reinforce the bond between the elements.

By virtue of such a manufacturing process, a perfect and undeteriorating bond is obtained between the connector and the tube fixed to the latter. Such a process is particularly suitable for joining tubular elements of a bicycle frame to the bottom bracket connector, an area which is subjected to very large stresses during use. In such an application, the additional connecting element is introduced inside the tubes of the frame, rests against a peripheral collar of smaller diameter than the inside diameter of the tube and is screwed inside a complementary part provided in the connectors of the bottom bracket housing.

The invention and the advantages which it affords will, however, be better understood by virtue of the exemplary embodiments which are given below on an illustrative but non-limiting basis and which are illustrated in the accompanying diagrams, in which.

Figure 1:
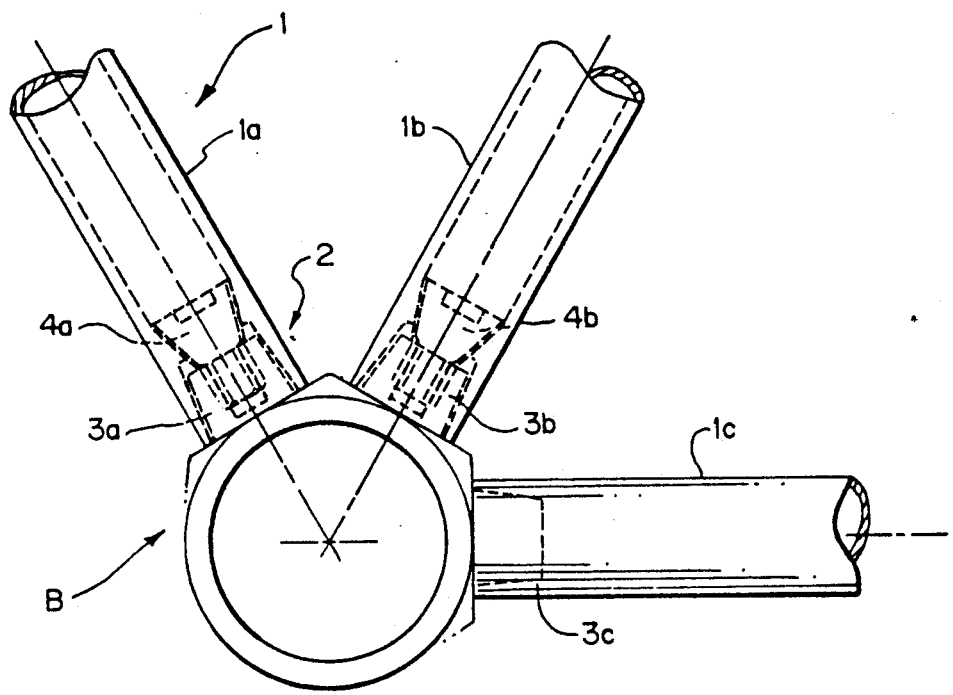
FIG. 1 is a diagrammatic side view of a bottom bracket housing of a bicycle frame constructed in accordance with the process according to the invention.

With reference to the accompanying diagrams, the invention thus concerns an improvement to the process for connecting and assembling tubular elements, designated by the general reference numeral (1) in the rest of the description, in which process the various tubes are joined to one another by means of connectors or sleeves, designated by the general reference numeral (2). The ends of these two elements are interlocked one inside the other and the bond is obtained by an adhesive. Such a could be used, as is evident from FIG. 1, for joining the various tubes (1a, 1b, 1c) to the bottom bracket housing B of a bicycle frame.

In accordance with the invention, in order to join the various tubes (1a, 1b, 1c) to the complementary receptacles or bearing surfaces (3a, 3b, 3c) with which the housing is equipped, after applying adhesive to either of the surfaces intended to come into contact, an additional connector (4a, 4b, 4c) is introduced inside one of the elements, in the present case inside each tube, one part of said additional connector being pressed against the inside of the surface of the element inside which it is introduced, and the other part of said additional connector being screwed inside the second element, the final setting of the adhesive taking place after installation of this additional joining element.

Various forms of implementing the process in accordance with the invention may be envisaged. According to a preferred form illustrated by FIG. 2, according to which form the tubular element (1) is fitted around the receptacle bearing surface (3) of the housing B, these two elements fitting together either concentrically or with the provision of a slight slope, similar to a joint of the Morse taper type well known in the engineering field, that is to say a joint which has a taper of approximately 1/20 and allows not only centering but also excellent locking to be obtained, the additional element (4) essentially takes the form of a "plug" the proximal part of "head" (5) of which, accessible from outside the tube (1), has a recess (for example a hexagonal so as to be able to actuate it, and the downstream or distal part or "joining shaft" (6) has a threaded area (7). The additional element or plug (3) is introduced inside the tube (1) in such a way that the peripheral surface (8) of the head (5) rests and is pressed against the inside of the surface (9) of the tube (1), which takes the form of a peripheral collar of smaller diameter than the diameter D of said tube (1). This peripheral collar consists, in the embodiment illustrated in FIG. 2, of a frustoconical part which is obtained by molding during the construction of said tube (1) and the cross section of which decreases towards the end (10) of the tube. The joining shaft (6) of the additional connector (3) is, for its part, screwed inside a complementary part (11) formed in the connector (3) of the housing B. During the installation of the additional connector (4), the previously applied adhesive tends to flow and seep into the space between the threads as well as into the area (12) contained between the various elements, which, after final setting, leads to a permanent immobilization not only of the tube (1) with respect to the sleeve (3), but also of the connector (5) with respect to the two abovementioned elements.

Figure 2:
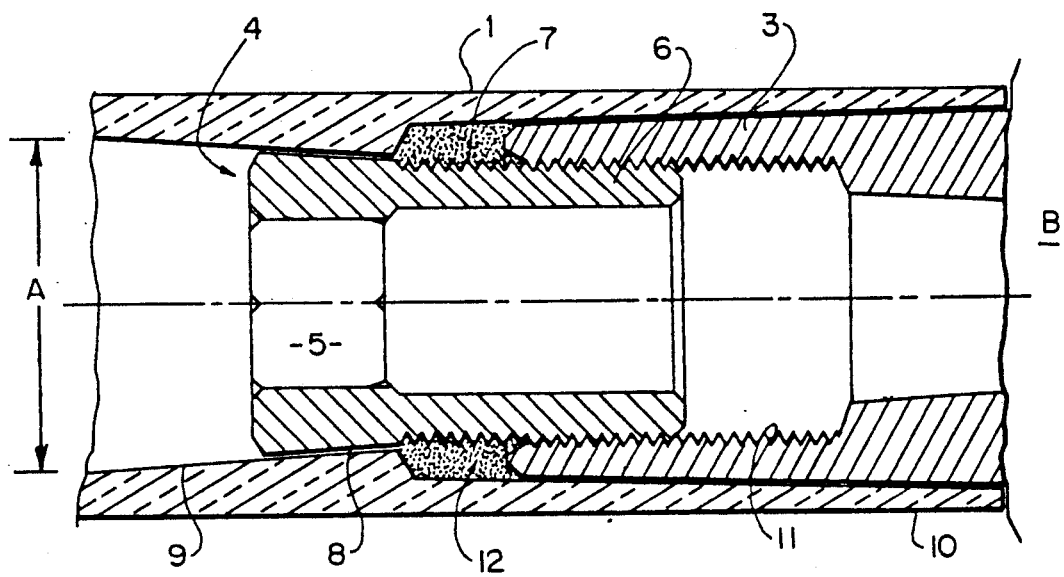
FIGS. 2, 3 and 4 are longitudinal sectional views illustrating various methods of implementing the process according to the invention.
Figure 3:
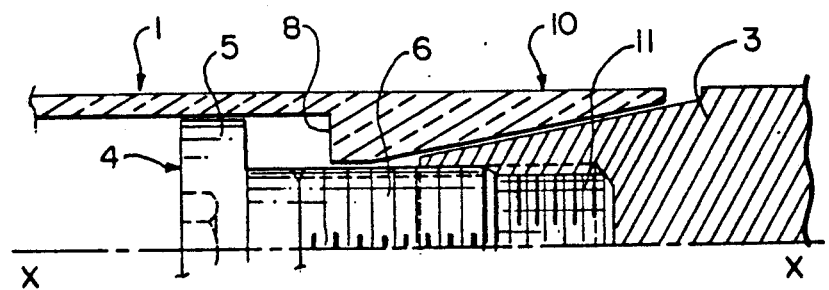

FIG. 3 illustrates a variant of the connecting method illustrated in FIG. 2 in which the tube (1) is likewise fitted around the joining connector (3). In this variant, the head (5) is pressed not against an inclined plane (8) formed inside the tube (1), but against an internal collar or shoulder, designated likewise by the reference numeral (8) and situated orthogonally with respect to the axis XX of the assembly.

Figure 4:
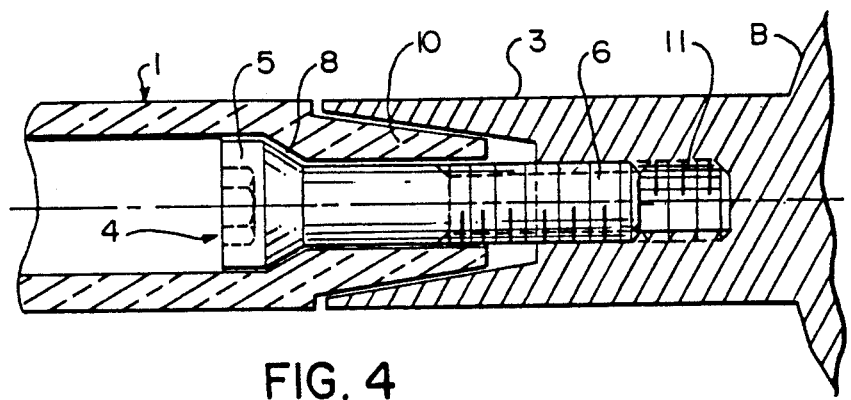

FIG. 4 illustrates another form of implementing the process according to the invention, in which the tube (1) is fitted not around the connector (3), but inside the latter.

As before, the tube and the connector are joined definitively by means of an additional connector (4), one part of which is pressed against the inside of the surface of the element inside which it has been introduced (in the present case the tube), and the other part of which is screwed inside the second element.

It has been found, in comparison with the previous solutions requiring solely adhesive bonding or solely screwing, that such an assembly has characteristics of resistance to tearing away and to compression which are clearly improved and that it is practically impossible to separate the supporting housing tube.

Figure 5:
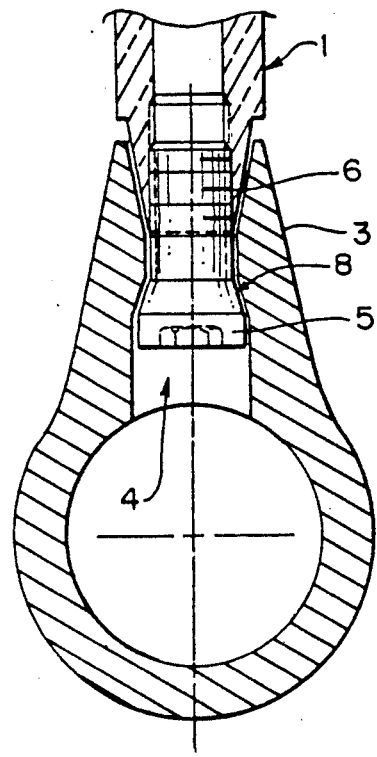
FIG. 5 illustrates a variant, according to which the additional element is introduced not inside the tube, but inside the connector and is screwed inside the tube.

Furthermore, although it is preferable to carry out the installation of the additional connector by introducing it inside the tubular element, it is of course possible, in dependence on the arrangement of the tubes relative to the main connectors, to envisage performing this installation via the inside of said connectors, the additional connector then being screwed into a complementary thread formed at the end of the tube. Such a possibility is illustrated by FIG. 5.

Of course, the invention is not limited to the exemplary embodiments described above, but covers all variants thereto constructed in the same spirit.

I claim:

1. A bicycle frame assembly comprising a plurality of tubular elements and at least a bottom bracket which joins the respective tubular elements, wherein each of the tubular elements has one respective tube end adhesively joined to a respective one of a plurality of connector receptacles formed on said bottom bracket, such that one of each said tube end and its associated connector receptacle fit together one into the other to be bonded together by a suitable adhesive; and for each said tubular element, a fastener which is introduced through the tubular element into the associated tube end, said fastener having a proximal portion that presses against a mating interior surface of the tube end and a threaded distal portion that screws into a mating threaded portion of the associated receptacle.

2. The bicycle frame assembly of claim 1 wherein said receptacle fits into the associated tube end and is frustoconic in shape.

3. The bicycle frame assembly of claim 2 wherein said tube end has a stop surface projecting inwards in the tubular element and against which the proximal portion of said fastener presses.

4. The bicycle frame assembly of claim 3 wherein said stop surface is a tapered surface.

5. A method of assembly of a plurality of tubular elements and at least one bracket which receives respective tube ends of said tubular elements, said bracket having a plurality of tube connector receptacles formed thereon to receive said tube ends such that one of the tube ends and its associated connector receptacle fit together one into the other to be bonded together by a suitable adhesive; comprising the steps of:

applying the adhesive onto mating surfaces of the tube ends and tube connector receptacles;

fitting the tube ends and respective connector receptacles one into the other;

introducing into the tube ends and respective connector receptacles for each of the plurality thereof a respective threaded fastener, each fastener having a first portion that presses against an inside surface of the one of the tube end and associated receptacle into which it has been introduced and a threaded portion projecting from the first portion that screws into a mating threaded portion of the other of the tube end and its associated receptacle;

screwing down said fastener to press together the mating surfaces of the tube end and respective connector receptacle; and permitting the adhesive to set.

6. The method of assembly of claim 5, wherein said fastener is introduced into the tubular element and tube end thereof and is screwed into the associated receptacle, 7. The method of assembly of claim 5, wherein each said tube end is fitted its associated receptacle, said receptacle being of generally circular cross section, said tube end having a surface projecting radially inward in the tube end serving as a stop surface against which the first portion of said fastener presses.

8. The method of assembly of claim 7 wherein said receptacle is generally cylindrical.

9. The method of claim 7 wherein said receptacle is frustoconic.

10. The method of assembly of claim 7 wherein said stop surface is a shoulder formed in said tube end.

11. The method of assembly of claim 7 wherein said stop surface is a tapered inside surface of said tube end.

* * * * *